Aug. 19, 1924.
O. J. CATHCART
1,505,698
VANITY CASE
Filed Oct. 2, 1922
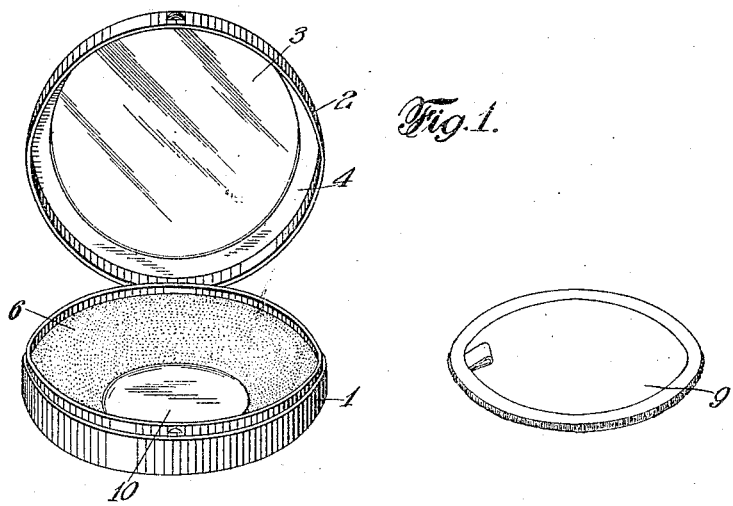
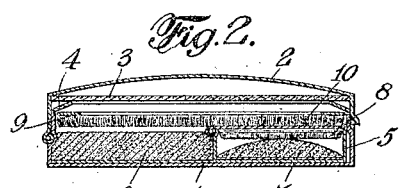
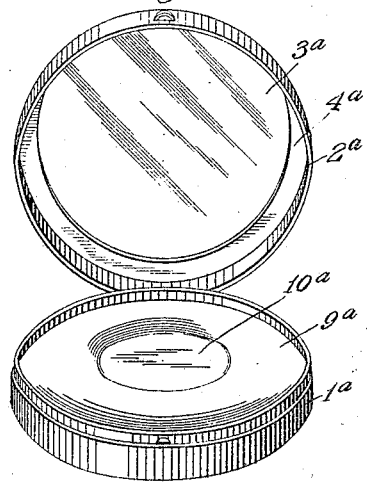
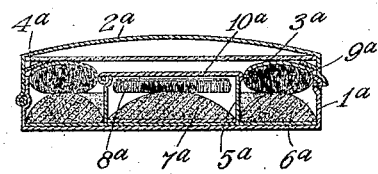
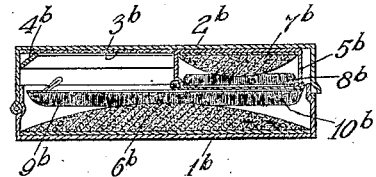
Inventor
Oswald J. Cathcart
By his Attorney
Louis Prevost Whitaker Patented Aug. 19, 1924.

1,505,698

UNITED STATES PATENT OFFICE.

OSWALD J. CATHCART, OF NEWBURGH, NEW YORK.

VANITY CASE.

Application filed October 2, 1922. Serial No. 591,712.

*To all whom it may concern:*

Be it known that I, OSWALD J. CATHCART, a citizen of the United States, residing at town of Newburgh, in the county of Orange and State of New York, have invented certain new and useful Improvements in Vanity Cases; and I do hereby declare the following to be a full, clear, and exact description of the invention, such as will enable others skilled in the art to which it appertains to make and use the same.

My invention consists in the novel features hereinafter described, reference being had to the accompanying drawing, which illustrates three forms in which I have contemplated embodying my invention, and the said invention is fully disclosed in the following description and claims.

The object of my invention is to provide a vanity case of small and compact form, suitable to be carried in a lady's hand bag, in which a quantity of powder and a smaller quantity of rouge, with appropriate puffs for the application thereof, in conjunction with a hand mirror, are so arranged that by simply opening the case, both the powder and rouge and their appropriate puffs will be accessible in conjunction with the mirror, without inverting the case.

Referring to the accompanying drawing, which illustrates three forms selected by me for the purpose of illustrating my invention, Fig. 1 is a perspective view of one form of vanity case embodying my invention, showing the case open and the powder puff detached, for greater clearness.

Fig. 2 is a sectional view of the vanity case shown in Fig. 1, in closed position.

Fig. 3 is a perspective view of a modified form of my improved vanity case in open position.

Fig. 4 is a sectional view of the case shown in Fig. 3, in closed position.

Fig. 5 is a sectional view of another modified form of the invention.

Referring to the form of my invention illustrated in Figs. 1 and 2, 1 represents the main body member, and 2, represents the main cover member, the said main members being preferably hinged together so that they may be opened or separated in the manner illustrated in Fig. 1. Within the cover member is located a mirror, indicated at 3, and held in place by a retaining ring, 4, in the usual manner.

Within one of the main members, and preferably the main body member, 1, is a rouge compartment, indicated at 5, of smaller diameter than the main body member, and having its opening within the space between the two main members so as to be accessible when the case is open. Within the main body member, 1, is the powder compartment, which in the form shown in Figs. 1 and 2 substantially surrounds the rouge compartment, and is filled with powder, indicated at 6, which may be either in the compact or pulverulent form. The rouge compartment is provided with a smaller quantity of rouge, indicated at 7, which may also be either in the compact or pulverulent form. Both the powder and rouge are shown in the compact form in the drawing, but this is not essential. Within the rouge compartment is a small rouge puff, indicated at 8, of substantially the same diameter as the rouge compartment, and within the main members of the case is a powder puff, indicated at 9, which in the form shown in Figs. 1 and 2, extends over the top of the rouge compartment, and is of substantially the same diameter as the main body member 1. In some instances I prefer to provide the rouge compartment with an independent cover indicated at 10, in Figs. 1 and 2, within the body members for the purpose of preventing the rouge from becoming accidentally mixed with the powder. The interior cover, 10, may in some cases be dispensed with, although I prefer to employ it.

In using the vanity case it will readily be seen that upon opening it in the position indicated in Fig. 1, access may be had to the powder puff, 9, and powder, 6, and by removing the powder puff, access may be independently had to the small rouge puff, 8, and rouge, 7, while the main cover member, 2, is maintained in vertical position with the mirror, 3, in proper position to facilitate the application of either rouge or powder, or both, without inverting the case.

In Figs. 3 and 4 I have shown a modification in which 1ª, represents the main body member, and, 2ª, the main cover member, carrying the mirror, 3ª, held in place by the retaining ring, 4ª. In this case the rouge compartment, indicated at 5ª, is located concentrically with respect to the main body member, 1ª, forming an annular space surrounding the rouge compartment, in which the powder, 6ª, is located. The powder may be formed as an annular compact, or may be in pulverulent form. The rouge compartment is provided with rouge, indicated at 7ª, which may be either in the compact or pulverulent form. The rouge compartment is provided with the puff, indicated at 8ª, and in this instance the powder puff, indicated at 9ª, is of annular form and surrounds the rouge compartment, ordinarily fitting between the rouge compartment and the outer walls of the body members, so as to practically form a cover for the powder compartment, and prevent the powder from being spilled therefrom. The rouge compartment may or may not be provided with a separate cover. I have, however, indicated a separate cover for the rouge compartment at 10ª, in Figs. 3 and 4.

In use this form of the device is utilized in the same manner as hereinbefore described, and it will be observed that the operator can use either rouge or powder in conjunction with the mirror without inverting the case.

It is to be noted that it is within the scope of my invention to locate the rouge compartment in the main cover member instead of in the main body member, in which case the mirror would be cut away to substantially surround the rouge compartment and this form of my invention is illustrated in Fig. 5. In this figure the main body member is indicated at, 1ᵇ, the main cover member at, 2ᵇ, the mirror at, 3ᵇ, held in place by the retaining ring, 4ᵇ. The rouge compartment, 5ᵇ, is located in the cover member and preferably eccentric thereto, so as to afford as wide a mirror space as possible, and is provided with the rouge cake, 7ᵇ, and puff, 8ᵇ. In this instance the entire lower portion of the main body member, 1ᵇ, serves as the powder compartment and contains the powder, 6ᵇ, either in compact or pulverulent form, together with a powder puff, 9ᵇ, which may be of substantially the same diameter as the main body member, 1ᵇ. The rouge compartment is also provided with an interior cover, 10ᵇ, as indicated in the other sectional views.

The specific forms of my invention illustrated in Figs. 1, 2 and 5, are not specifically claimed herein as they are specifically claimed in another application filed by me on Jan. 26th, 1923, Serial No. 614,973, which is a division of this application.

What I claim and desire to secure by Letters Patent is:—

1. A vanity case comprising a main body member and a main cover member therefor, a rouge compartment of smaller diameter than said main members, located within the said main members, and having its mouth within the space between said main members, one of said main members being provided with a powder compartment within the same but exterior to the rouge compartment, a puff in said rouge compartment, a separate cover for the rouge compartment of smaller diameter than the main cover member, located in the space between the main members, a puff for the powder compartment of larger area than the rouge puff, located in the space between the main members, and a mirror carried by the main cover member within the same.

2. A vanity case comprising a main body member and a main cover member therefor, a rouge compartment of smaller diameter than the main members, located substantially centrally within the main body member and having its mouth within the space between said main members, and forming an annular powder compartment surrounding the rouge compartment, a rouge puff in said rouge compartment, and an annular powder puff in the powder compartment within the main body member, whereby access may be had to the rouge compartment through the central aperture of the powder puff.

3. A vanity case comprising a main body member and a main cover member therefor, a rouge compartment of smaller diameter than the main members, located substantially centrally within the main body member and having its mouth within the space between said main members, and forming an annular powder compartment surrounding the rouge compartment, a rouge puff in said rouge compartment, and an annular powder puff in the powder compartment within the main body member, surrounding the rouge compartment, a separate cover of substantially the diameter of the rouge compartment for closing the mouth thereof, and a mirror carried by said main cover member, on the inner face thereof.

4. In a device of the character described, a container, an annular powder compact, mounted in said container, a cup which fits the center opening of said annular compact, a cover for said cup, a rouge compact in said cup, a cover for said container, a mirror mounted in said cover, a powder puff intermediate the powder compact and the mirror.

In testimony whereof I affix my signature.

OSWALD J. CATHCART.